(12) United States Patent
Altpeter (10) Patent No.: US 7,310,560 B2
(45) Date of Patent: Dec. 18, 2007

(54) NUMERICALLY CONTROLLED DRIVE DEVICE WITH DEVICE FOR DETECTING OPERATING ANOMALIES INTENDED FOR DETECTING ACCIDENTAL COLLISIONS AND METHOD OF DETECTING OPERATING ANOMALIES FOR THIS DEVICE

(75) Inventor: Friedhelm Altpeter, Susten (CH)

(73) Assignee: Charmilles Technologies SA, Meyrin (CH)

( * ) Notice: Subject to any disclaimer, the term of this patent is extended or adjusted under 35 U.S.C. 154(b) by 365 days.

(21) Appl. No.: 11/114,635

(22) Filed: Apr. 25, 2005

(65) Prior Publication Data
US 2005/0238043 A1    Oct. 27, 2005

(30) Foreign Application Priority Data
Apr. 27, 2004   (CH) ................................. 0735/04

(51) Int. Cl.
*G05B 19/18* (2006.01)
*G06F 17/50* (2006.01)

(52) U.S. Cl. ........................... 700/61; 700/51; 700/56; 703/1

(58) Field of Classification Search ................ 700/61, 700/51; 703/1
See application file for complete search history.

(56) References Cited

U.S. PATENT DOCUMENTS

| | | | |
|---|---|---|---|
| 4,820,895 A | | 4/1989 | Obara |
| 5,023,045 A | * | 6/1991 | Watanabe et al. ........... 376/215 |
| 5,119,006 A | | 6/1992 | Torii et al. |
| 5,304,906 A | | 4/1994 | Arita et al. |
| 5,714,853 A | | 2/1998 | Knab et al. |
| 5,739,660 A | | 4/1998 | Gnann |
| 5,982,124 A | | 11/1999 | Wang |
| 6,295,478 B1 | * | 9/2001 | Inada ........................... 700/51 |
| 6,657,409 B1 | | 12/2003 | Leivenzon et al. |

FOREIGN PATENT DOCUMENTS

| | | |
|---|---|---|
| DE | 34 26 863 | 9/1986 |
| DE | 40 08 661 | 9/1991 |
| DE | 199 60 834 | 8/2001 |

OTHER PUBLICATIONS

Altpeter, Friedhelm, "Friction Model, Identification and Compensation" 1999 Thesis Lausanne Switzerland p. 1-149.*
Ghorbel et al., "On the Kinematic Error in Harmonic Drive Gears" 2001 ASME Transactions p. 90-97.*

* cited by examiner

*Primary Examiner*—Anthony Knight
*Assistant Examiner*—Tom Stevens
(74) *Attorney, Agent, or Firm*—Bachman & LaPointe, P.C.

(57) ABSTRACT

A drive device for a load (18*a*) comprises a device for detecting accidental collisions with a motor (14*a*), a first, respectively a second position sensor (15*a*, 16*a*) disposed upstream, respectively downstream of a transmission assembly (12*a*) providing first and second values of position. A calculation unit (20) makes it possible to calculate an error signal (d) corresponding to the difference of these position values. Ways to discriminate are devised so as to analyze the successive error signals as a function of the path ($x_R$) traversed by the load in a spatial reference frame ($x_R$, d). Filters with rectangular spatial window or with exponential spatial window are particularly adapted for discriminating between errors due to an accidental collision and those due to other causes attributable to normal operation. One thus obtains particularly reliable and sensitive collision detection with a very low detection threshold.

23 Claims, 8 Drawing Sheets

NUMERICALLY CONTROLLED DRIVE DEVICE WITH DEVICE FOR DETECTING OPERATING ANOMALIES INTENDED FOR DETECTING ACCIDENTAL COLLISIONS AND METHOD OF DETECTING OPERATING ANOMALIES FOR THIS DEVICE

BACKGROUND OF THE INVENTION

The present invention relates to a numerically controlled drive device comprising a device for detecting operating anomalies intended for detecting accidental collisions, comprising:
- at least one motor able to drive a load along at least one path by way of an assembly of transmission elements,
- first means of measuring position disposed upstream of at least one of the elements of the said assembly for transmission to the motor and intended to provide a first value of position,
- second means of measuring position disposed downstream of this element of the assembly for transmission to said load and intended to provide a second value of position corresponding to the position of the load on said path,
- means of calculation for establishing at predetermined intervals error signals corresponding to the difference of the first and second values of position, and
- means of analysis for analyzing these error signals so as to detect accidental collisions.

Such devices have already been used in the machine-tool field as described in document DE 34 26 863 A1.

Comparable drive devices are used in numerous other applications, such as robots, printing machines, equipment for textile production, injection molding machines, stamping and blanking, cranes, satellite antennas, telescopes, etc.

Figure 1:
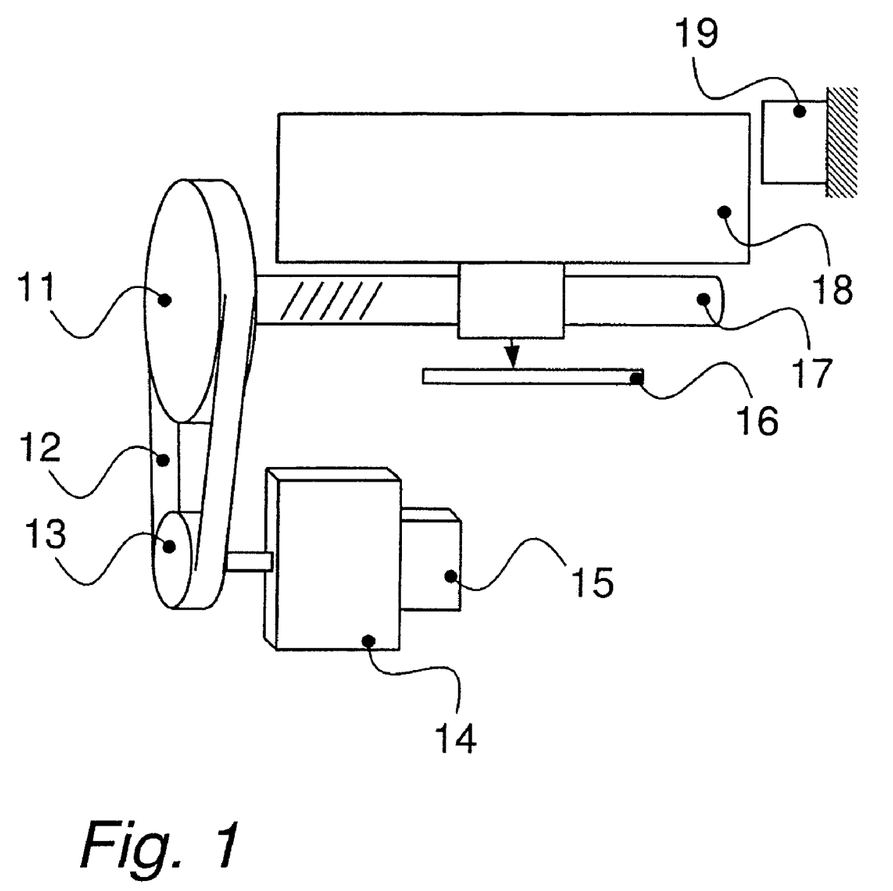
FIG. 1 shows a numerically controlled drive device.

In the drive devices such as represented in FIG. 1, the position of the motor 14 is measured by means of an encoder 15 so as to control the phase commutations at the correct positions of the rotor of the motor. The motor torque is transmitted to the load 18 representing for example the work table or else a spindle fitted with a tool by way of a transmission by pulleys 11 and 13 and belt 12 followed by a ballscrew with nut 17. The position of the load 18 is measured by means of a linear rule 16. The end of travel is determined by a mechanical stop 19 so as to protect the mechanism in case of a defect with the servodrive software. This stop 19 may serve in a machine preparation phase as absolute reference for the initialization of the spindle. Such initialization is necessary in the case where the linear rules do not provide this reference. Generally, end-of-travel contactors are then used for initialization. If these contactors are done away with for cost reduction reasons or the like, then a reliable and effective collision detection device as proposed by the invention becomes necessary in order to use the stop 19 as a reference, without any risk of damaging the mechanics of the device through excessive impact forces.

When using a machine tool, a robot or another item of equipment with an articulation driven by a servomotor, an element in motion may collide with another member of the machine, a workpiece to be machined or with a component of the environment. In this case, the problem to be solved consists in preventing and/or detecting the collision.

The preventive measure that is most widespread within the art, is the limitation of the travel of the spindle in question by means of end-of-travel contactors forming a hard-wired logic limitation, through the prior definition of bounds to the allowable domain of position settings constituting a software limitation, or else with the aid of mechanical stops forming a physical limitation. Within this context of the prevention of collisions, U.S. Pat. No. 5,347,459 has also proposed that the workspace be modeled so as to identify in advance interference between the bodies in relative motion. The drawback of this modeling procedure is the need to ascertain the kinematics of all the objects in the work zone, this information being unavailable for example in regard to a machine tool for the offcuts that could get jammed between the workpiece and the tool. In order to make up for this lack of knowledge regarding the location of bodies in the workspace, recourse has been had for example to vision systems, this nevertheless remaining a complex and expensive solution.

U.S. Pat. No. 4,820,895 proposes an electric touch sensor in the case of an electroerosion machine. Such a device can, according to patent DE 40 08 661 A1, serve in the alignment of a three-dimensional tool on a semi-finished workpiece, doing so through its capacity to detect tool-workpiece collisions accurately and without waste. However, the use of an electric touch sensor requires the presence of electrically conducting objects.

U.S. Pat. No. 5,119,006 has proposed that a certain number of criteria being monitored, such as the absolute value of the servodrive motor torque/current. The procedures described in this patent are restricted to drives with a rigid or very precise transmission, which require mechanical solutions that are needlessly expensive in the case of certain industrial applications for which the introduction of a second rule position sensor makes it possible to implement software procedures for compensating for errors related in particular to flexibility or to homokinetic defects. This compensation may give rise to taxing demands on the motor speed feedback loop, as well as to large speed tracking errors and so to large variations in the motor current. Moreover, if the inertia of the motor dominates the inertia of the load, referred to the motor side, then the effect of the forces of a collision on the motor current is negligible vis-á-vis the forces to be provided for a normal acceleration, respectively deceleration. Thus, the raw signals, such as proposed in U.S. Pat. No. 5,119,006 no longer contain the relevant information making it possible to identify a collision with sufficient sensitivity to avoid waste.

For better utilization for the detection of collision of the motor torque signals, respectively motor current and speed signals, U.S. Pat. No. 5,304,906 proposes the construction of a disturbing torque observer based on the parameters of the drive and the filtering parameters intended to reduce the influence of measurement noise at high frequency. However, the method proposed in this U.S. Pat. No. 5,304,906 is limited to a rigid model for the transmission of the drive. The procedure is thus insufficient for drives for which the flexibility of transmission and the homokinetic defects assume considerable significance. Moreover, the knowledge of the parameters such as the inertia and the torque constant of the motor is incompatible with numerous applications such as machine tools where the mass to be driven may easily vary by a factor of 5 during normal use of the installation.

Patent Application DE 199 60 834 A1 proposes that a rule position be measured on the driven part of the spindle and that this measurement be compared with an indirect measurement taken inside the transmission chain, so as to form an error signal. An abrupt increase in the said signal indicates that a collision or an abnormal incident has occurred. However, nothing is suggested therein other than to compare the temporal increase in the error signal with a limit fixed in advance. The problem with this error signal relating to position between motor and driven part is that it is marred by homokinetic errors, which are characteristic of normal operation and again lead to the triggering limit being fixed at an excessive value. On the other hand, the solution advocated is unsuitable when it is necessary to violently accelerate large inertias. Such is the case for the X and Y spindles of electroerosion machines, which serve to move the assembly of the workpiece to be machined and the tray filled with dielectric liquid, the driven masses possibly reaching as much as one tonne.

SUMMARY OF THE INVENTION

An aim of the present invention is remedy the aforesaid drawbacks and for this purpose it is one wherein the means of analysis comprise discrimination means devised in such a way as to analyze said error signals obtained in said predetermined intervals as a function of the path traversed in a spatial reference frame with a view to discriminating between errors due to an accidental collision and those due to at least one other cause.

By virtue of these characteristics, it is possible to reliably and rapidly detect accidental collisions, with a detection threshold that is considerably lowered with respect to known devices.

Favorably said transmission assembly possesses a flexibility of transmission which is used by virtue of said error signals as force gauge relating to the driving of the load.

These characteristics allow a very simple construction and a very advantageous cost price.

According to a preferred mode of execution, the means of discrimination comprise at least one restriction of the relevant domain of the data pertaining to the error signals over a limited movement of the load along the path forming at least one spatial window featuring a path traversed by the load devised in such a way as to discriminate between errors due to an accidental collision and those due to at least one other cause.

One thus obtains particularly dependable detection with a reduced detection threshold.

Advantageously the means of discrimination consist of spatial means of filtering adapted for discarding homokinetic errors and/or errors due to thermal variations.

By virtue of these characteristics, any detection defects may be efficaciously avoided.

According to an advantageous mode of execution the means of filtering comprise two circular arrays of data pertaining on the one hand to the movements of the load over said path and on the other hand to the error signals corresponding to these movements and at least one spatial rectangular window comprising the most recent data pertaining to said movements and to said error signals extracted from the two circular arrays.

One thus obtains a detection device of original principle and great reliability.

According to another favorable mode of execution, the means of filtering comprise at least one spatially invariant linear filter which comprises an exponential spatial window.

This mode is especially practical, since it makes it possible to obtain fast and dependable detection of anomalies with a calculation unit of smallish size.

The invention also relates to a method of detecting operating anomalies intended for detecting accidental collisions on numerically controlled drive devices comprising:
 at least one motor able to drive a load along at least one path by way of an assembly of transmission elements,
 first means of measuring position disposed upstream of at least one of the elements of the said assembly for transmission to the motor and intended to provide a first value of position,
 second means of measuring position disposed downstream of this element of the assembly for transmission to said load and intended to provide a second value of position corresponding to the position of the load on said path,
 means of calculation for establishing at predetermined intervals error signals corresponding to the difference of the first and second values of position, and
 means of analysis for analyzing these error signals so as to detect accidental collisions, wherein means of discrimination are employed so as to analyze said error signals obtained in said predetermined intervals as a function of the path traversed in a spatial reference frame with a view to discriminating between errors due to an accidental collision and those due to at least one other cause.

By virtue of this method a detection of accidental collisions may be obtained in a simple and reliable manner with a smallish detection threshold as compared with known methods.

BRIEF DESCRIPTION OF THE DRAWINGS

Other advantages emerge from the description hereinafter setting forth the invention in greater detail with the aid of drawings which represent diagrammatically and by way of example two modes of execution.

FIGS. 3a to 3f illustrate the variations in different signals during a forward and return movement of the load.

FIGS. 6a to 6d illustrate the variations in different signals during a movement with a stoppage (collision) of the load.

FIGS. 7a to 7h illustrate the variations in different signals of a spatially invariant filter used in a second exemplary mode.

DETAILED DESCRIPTION

Figure 2:
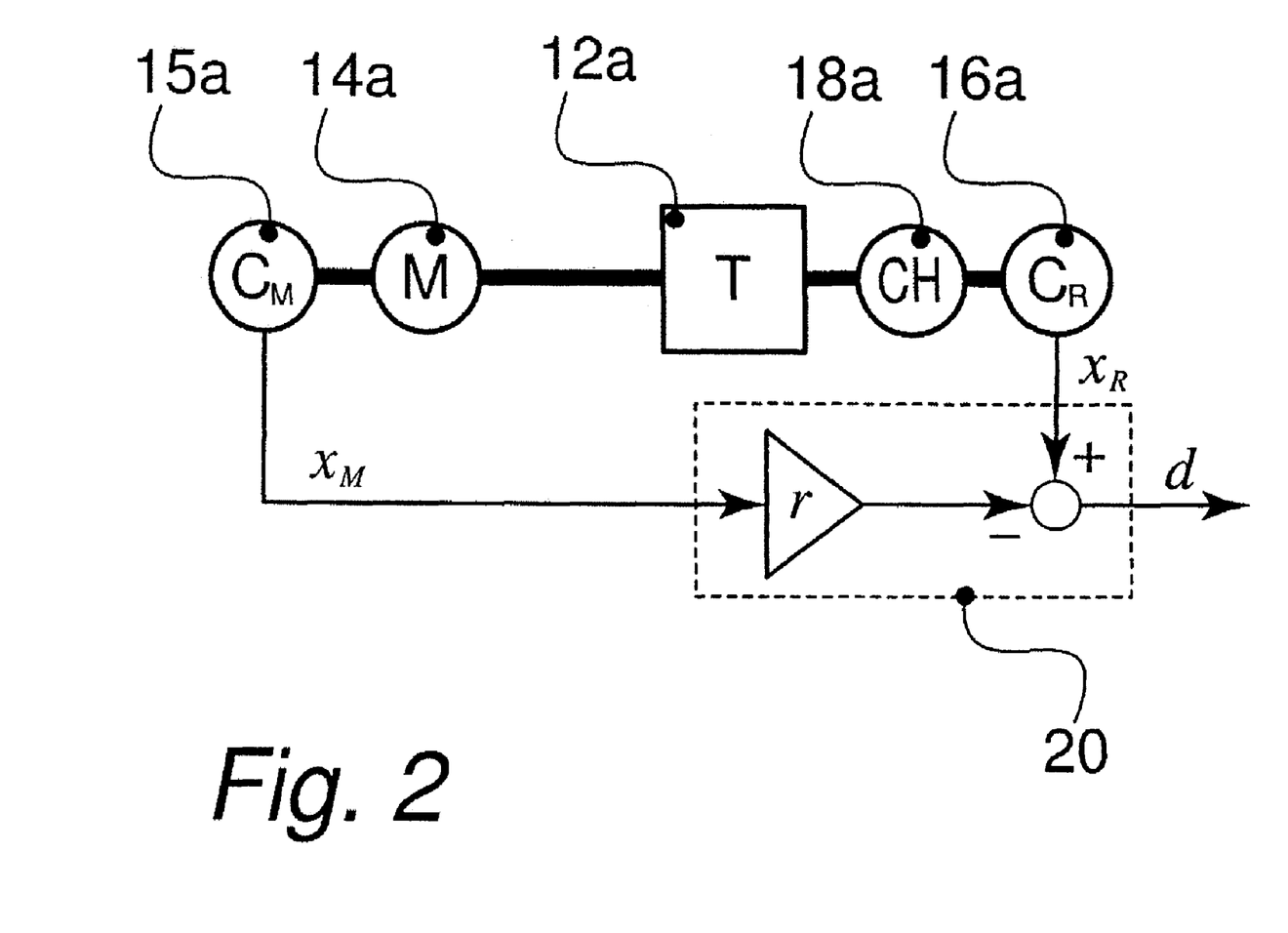
FIG. 2 illustrates a basic diagram of the means for establishing error signals d.

The numerically controlled drive device of the present invention possesses a general configuration such as illustrated in FIG. 2. The motor 14a is associated with a first position sensor 15a providing a first value of position $x_M$ and constituting first means of measuring position disposed upstream of a transmission assembly 12a through which the motion is transferred to the load 18a which is moved along a path. The position of the load 18a is measured by virtue of a second position sensor 16a providing a second value of position $x_R$.

Means of calculation, in the form of a calculation unit 20, are devised so as to calculate at predetermined time intervals an error signal d according to the equation $$d = x_R - r x_M$$

where r is equal to the reduction ratio of the transmission assembly 12a.

The error signal d therefore corresponds to the deviation between the position of the load and the motor position in relation to the load.

In the configuration illustrated in FIG. 1, the error $d = x_R - r x_M$, is the sum of the errors due to the elements of the transmission, that is to say mainly the belt, the contacts between balls and ball raceways, the nut and the screw, which each act with their flexibility and their own kinetics.

Other transmission elements are conceivable, such as shafts, harmonic-drive, etc.

However, it is preferable to choose components having no play. Elements, such as a gear with no prestress, exhibiting play on reversal, for example, are easily subject to perturbing oscillations sustained by the servocontrol and will require particular constraining precautions.

Figure 3A:
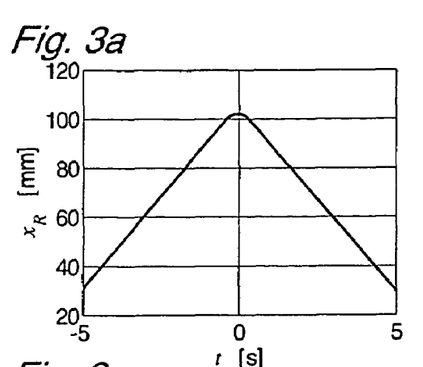
FIG. 3a shows the positions $x_r$[mm] occupied by the load as a function of time t[s].
Figure 3B:
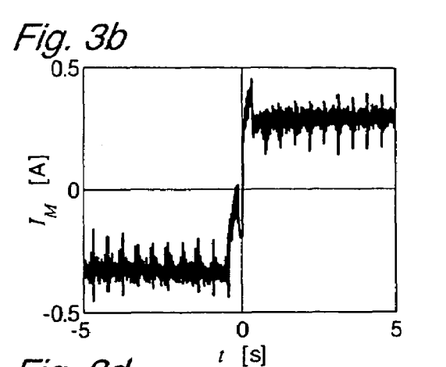
FIG. 3b illustrates the current $I_M$[A] of the motor as a function of time t[s].
Figure 3C:
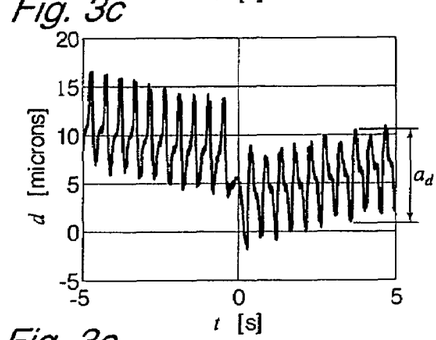
FIG. 3c illustrates the variations in the error signal d[microns] as a function of time t[sec].
Figure 3D:
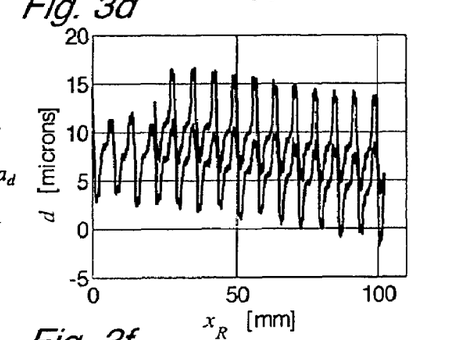
FIG. 3d shows the variations in the error signal d[microns] as a function of the positions $x_R$[mm] occupied by the load.
Figure 3E:
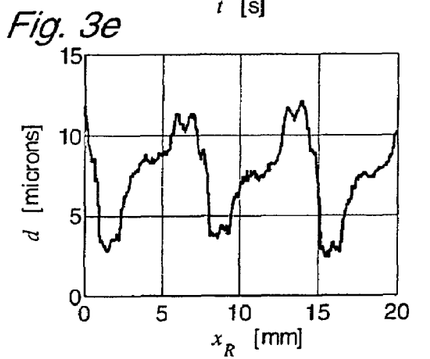
FIG. 3e illustrates a magnified part of FIG. 3d.

The error signal d illustrated in FIGS. 3c, 3d and 3e relating to a forward and return movement of the load therefore consists of a dynamic contribution associated with the accelerations of the spindle and with the flexibility of the transmission, and a kinetic contribution or homokinetic error associated with manufacturing and assembling defects, respectively with temperature effects that falsify the reduction ratio r by changing the length of the ballscrew. The dynamic component of the error signal d is naturally represented in a temporal reference frame, whereas a spatial reference frame is the typical representation of the kinetic component; for example respectively FIG. 3c as opposed to FIG. 3d.

The teachings given by DE 199 60 834 A1 suggest observation of an abrupt increase in the error d, stated otherwise a quantity of the type Δd/Δt. We shall see that such an approach compels the fixing of exaggerated detection limits so as to be able to ignore the sum of the defects detailed hereinbelow, which must be tolerated, being as they are typical of normal operation in particular collisionless.

As illustrative example, it is proposed to consider the y spindle of an electroerosion machine. The inertia of the motor 14 equals 0.31 g m$^2$, the reduction ratio of the belt transmission 11-13 is 5, the pitch of the screw 17 is 5 mm/turn, the mass of the table carrying the workpieces to be machined varies between 620-1120 kg, the rigidity of the transmission is k=175 N/μm.

FIGS. 3c, 3d and 3e illustrate the signal d of a drive of the type shown in FIG. 1 for a large movement and a reversal of direction of velocity.

The homokinetic error originates from defects of manufacture of the screw and for disturbances generated by the system for recirculating the balls inside the nut. For the particular case illustrated in FIG. 3e when the position of the load $x_R$ is represented as abscissa, a spatial pseudo-period of 7 mm is observed. The amplitude of 10 microns in this case typifying this homokinetic defect gives it a predominant character, compels the choice of a spatial reference frame and moreover compels the detection devices to dispense, among other things, with said pseudo-period by means of appropriate filtering.

To this fluctuating quantity are added the errors of thermal type which are manifested as a drift in the signal d as a function of position $x_R$ since the length of the screw and thus the reduction ratio r changes.

For a steel ballscrew of length 440 mm, for example, whose thermal expansion coefficient equals 12 microns per meter and degree Kelvin, the error for a variation of 1° C. engenders a defect of 5.28 microns. Such a temperature variation may originate from changes of the air in the workshop, the exposure of the machine to sunlight, or even local warming engendered by the motions of the spindle and friction in the ball bearings. These thermal type errors explain in the plot of FIG. 3d the inclination of the signal d as a whole, around 5 microns for 100 mm traversed, to which the detection device must remain insensitive. Another constraint imposed on the detection devices will be to dispense with said inclination, likewise a defect of a spatial nature.

In the same plot of FIG. 3d of the signal d as a function of the movement $x_R$ can be observed a vertical offset between the forward leg and the return leg, due to the force of friction in the linear guideways of the spindle which invoke the flexibility of the transmission. This friction/flexibility defect, which is of a dynamic nature, is of the order of 5 microns in the case represented, will not be filtered, like the high-frequency components of the signal d, (see FIG. 3e) which are due to the excitation of the natural frequency of the device, and are determined by the flexibility of transmission and the inertias at the two ends. The manifestation of these frequencies may also be observed in FIG. 3b which shows the plot of the motor current $I_M$ as a function of time t.

According to the present invention, the flexibility of transmission is used as force gauge regarding the load which generates said transmission error signal d whose components are discriminated and filtered of the homokinetic defects so as to avoid triggering a false collision alarm in the presence of tolerable defects. In order to perform said filtering, the spatial increases in the error signal are observed, instead of monitoring its abrupt temporal increases.

The significant point is that the error signals d are processed by analysis means comprising discrimination means devised so as to analyze the error signals obtained in the intervals predetermined as a function of the path $x_R$ traversed in a spatial reference frame d, $x_R$ with a view to discriminating between errors due to an accidental collision and those due to at least one other cause.

The influence of homokinetic errors of transmission are dispensed with by means of a restriction of the relevant spatial domain of the data regarding a limited movement by forming at least one spatial window featuring a path traversed by the load devised in such a way as to discriminate between errors due to an accidental collision and those of other causes.

This restriction of the relevant spatial domain is achieved either by virtue of a rectangular window and a circular array properly managed according to the first mode of execution, or by virtue of one or more exponential windows according to the second mode of execution whose manner of operation associated with the spatially invariant filters (linear space invariant LSI) will be explained hereinbelow.

These means of filtering by restriction of the spatial domain are chosen experimentally so as to discard homokinetic errors and/or thermal errors.

Figure 4:
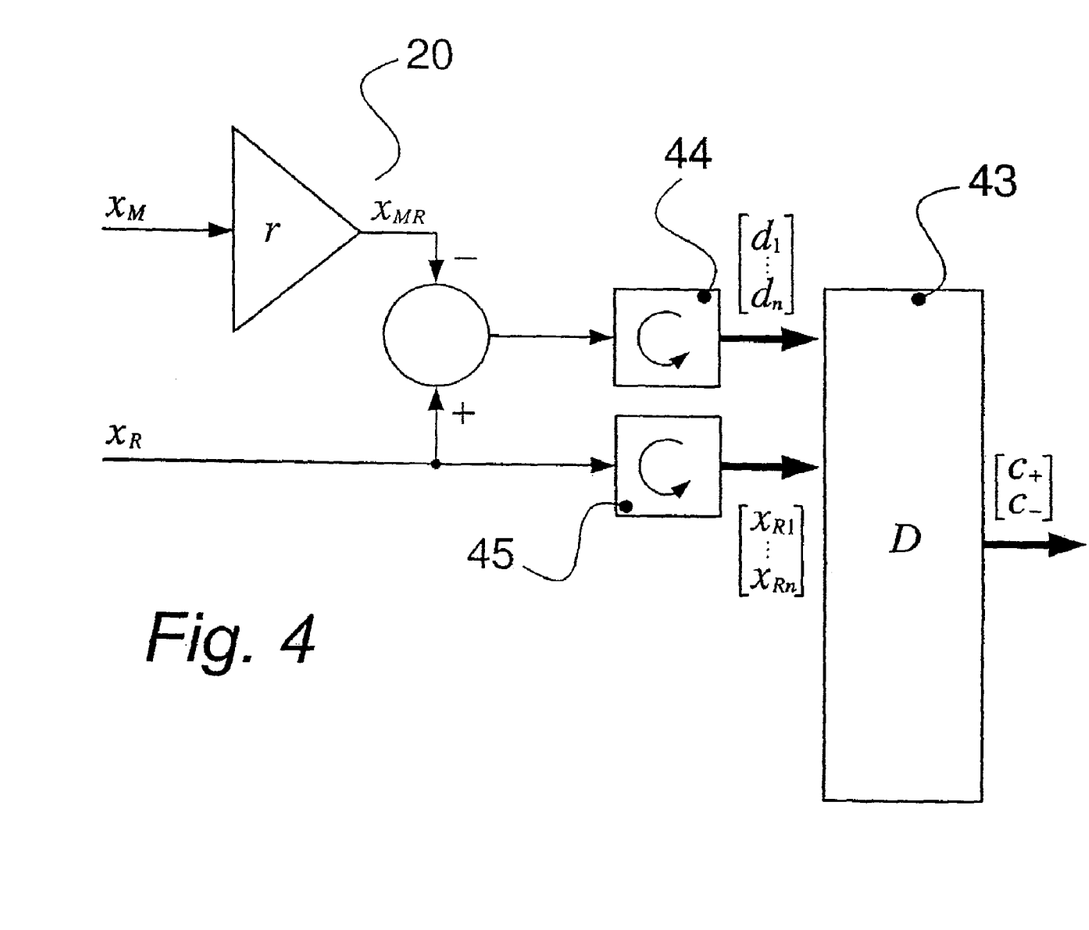
FIG. 4 is a basic diagram of a first mode of execution of the device for detecting accidental collisions.

The first mode of execution with a rectangular window in space is based on the software architecture illustrated in FIG. 4.

The first and second values of position $x_M$ and $x_R$ are provided to the calculation unit 20 which establishes the error signal $d = x_R - r\, x_M$.

The values of d and $x_R$ are recorded in two circular arrays 44 and 45 of size n, n being for example 50.

The index 1 denotes the most recent sample recorded. Recording is performed in accordance with a predetermined sampling period, for example 2 msec.

From these logged data is extracted a subset of the most recent successive samples $D=\{i: 1 \geq i \geq i\ max\}$ for which the domain of the positions traversed remains less than a limit $L_x$ or width of the spatial window, such that $$\sum_k |x_R(k) - x_R(k-1)| \leq L_x \qquad \forall\, k \in D$$

It is judicious to choose the width of the spatial window $L_x$ at a fraction of the period of the local homokinetic error; for example, for a periodicity at 7 mm, one advantageously chooses $L_x=0.1$ mm. By decreasing $L_X$, the homokinetic defects are ignored more and more, not allowing the detection of collisions other than with regard to more and more rigid members. A large spatial window $L_X$ allows the detection of soft members, but the homokinetic defects are almost unattenuated and the detection level $L_{d,rel}$ must be chosen likewise large, thereby reducing the sensitivity of the method to detect a collision.

Stated otherwise, the subset 43 of the most recent successive samples $D=\{i:1 \geq i \geq i\ max\}$ may be viewed as a sliding rectangular spatial window in which are found as abscissa the movements $x_R$ by the load and as ordinate the error $d=x_R - r\, x_M$.

It is essential that the path taken into account in said window $$\sum_k |x_R(k) - x_R(k-1)|$$

remain independent of the velocity of the spindle in the case of temporal sampling, for example at regular intervals h of 2 msec.

It should be noted here that a spatial sampling, obtained by replacing for example the pulses of the clock with pulses similar to those of a clock but produced by the encoder 15 (FIG. 1) at regular intervals h of ¹⁄₁₀₀th of a degree for example would make it possible to process the signal, in the explanation hereinafter, as if the velocity of the spindle were to remain constant.

A collision will be characterized by the overstepping of a limit $L_{d,rel}$, defined hereinbelow, of the dynamic range of d over the subset D chosen in the rectangular window 43 according to the operation $$\Delta d_{\max} = \max_{k \in D} d_k - \min_{k \in D} d_k \geq L_{d,rel}$$

where
  max $d_K$ is the maximum value of d in the subset D and
  min $d_K$ is the minimum value of d in the subset D.

Stated otherwise, each time the size and the content of the window 43, realized by the circular memories, are updated, we retain the maximum value d and the minimum value d from among the subset D of relevant samples (log), so as to form the difference thereof and then compare it with a threshold value $L_{d,rel}$. Each sample of pairs of values $x_R(k)$, $d_K$ is stored with the same weight in the rectangular window, hence the name rectangular.

The prior choices of the threshold $L_{d,rel}$, and of the width of the sliding window $L_x$, that is to say the calibration of the device need to be made on an installation in good working order.

The value of $L_{d,rel}$ will be fixed by observation and analysis of the amplitude and of the shape of the local homokinetic error. It is proposed that the tailoring of the triggering limit $L_{d,rel}$ be based on the empirical properties of the drives concerned. The procedure consists in recording the domain of variation of d over the subset D chosen, for a certain number of relevant situations which must not trigger the collision detection, in particular:

programmed movements by fast motion comprising reversals of motion, as well as indicial jumps in speed, for example 0.1 mm/s, 1 mm/s and 10 mm/s.
  manual movements at various speeds, including slow speeds and manual movements in stepper mode.
  so-called "machining feed" or "machining exit" transient periods characterized by the passage from a zone without machining to a zone with machining or vice versa.

Thus, the highest $$\text{value of } \Delta d_{\max} = \max_{k \in D} d_k - \min_{k \in D} d_k$$

for normal operation is evaluated. The triggering limit $L_{d,rel}$ is chosen with a sufficient margin, such that $L_{d,rel}$ is fixed at m % of the maximum value of $\Delta d_{max}$, m advantageously lying between 120 and 250, very favorably between 140 and 200 and preferably being equal to 150.

Figure 3F:
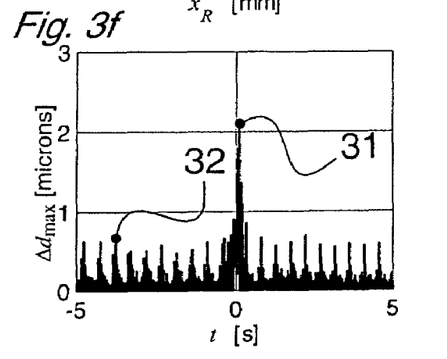
FIG. 3f shows the variations in the signal $\Delta d_{max}$=max $d_K$-min $d_K$ [microns] as a function of time t [s].

FIG. 3f shows such a tailoring graph for a high speed movement, the case identified as being the most critical for the drive concerned. The maximum of $\Delta d_{max}$ at 2 microns, labeled 31, is attained upon reversal of the direction of motion because of the energy recovered upon the reversal of the motion. It has been possible to reduce the influence of the homokinetic defects of the mechanical transmission to 0.8 microns maximum, labeled 32 in this figure. For the case shown, the triggering limit may thus be chosen at $L_{d,rel}=3$ microns, while allowing a safety margin of 50%; to be compared with the 20 to 30 microns necessary for the methods known in the state of the art and emerging from observation of FIG. 3c.

By virtue of the invention the collision detection threshold may therefore be lowered by a factor of six to seven as compared with the known methods.

As shown in FIG. 3f the operation $$"\max_{k \in D} d_k - \min_{k \in D} d_k"$$

in the rectangular window 43 carries out a high-pass filtering which removes from the signal d the spatial component corresponding to the pseudo-period of around 7 mm, as well as to the drifts of thermal type. Expressed in a more general manner, the influence of the thermal and homokinetic errors of transmission are dispensed with by means of a restriction of the relevant spatial domain of the data regarding a limited movement; hence the possibility of placing the limit $L_{d,rel}$ at a smaller value allowing better sensitivity.

In the most widespread cases when the sampling is regulated by a clock, the limits of the spatial window of a predetermined length do not generally coincide with the moment of measurement of the samples of pairs of variables $x_R$ and d. It is therefore necessary to perform an interpolation which is especially useful in the case of high speed movement when a small number of samples is used, for example 3 samples.

The most recent spatial limit of the spatial window is not interpolated, whereas the oldest spatial limit furthest from the window by a width $L_X$ forms the subject of an interpolation for the value of the error signal d.

This interpolation value is then stored as oldest sample of the spatial window. No interpolation is necessary if the sampling h is spatial instead of being temporal.

Figure 5:
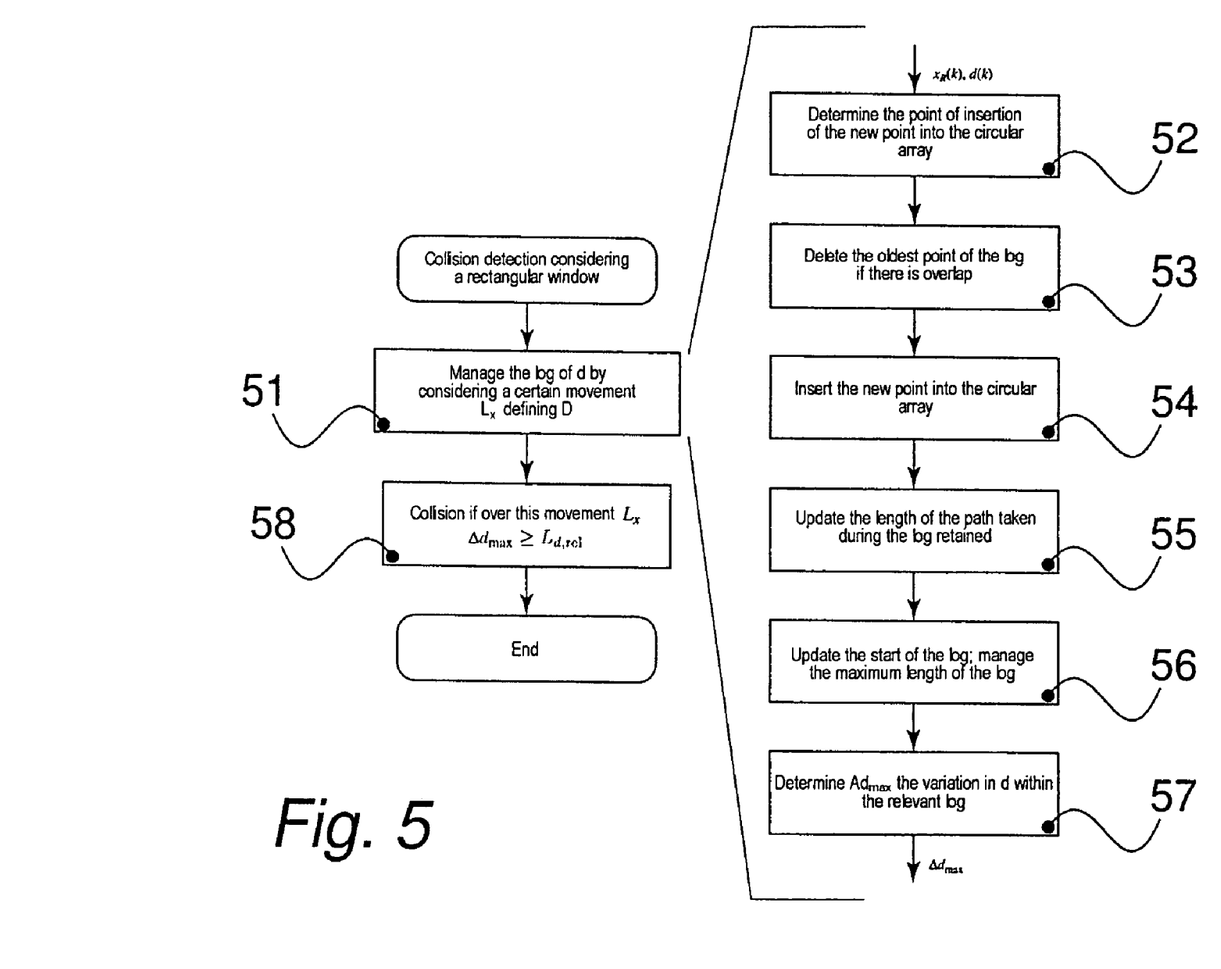
FIG. 5 shows a diagram of the flows used in the first mode of execution.

For the embodiment of the detection device, it is preferable to combine the operations described hereinabove into a single software function, called periodically, for example with a periodicity h of 2 msec. FIG. 5 shows the diagram of the flows corresponding to this rectangular window-based collision detection method. The management of the log of the block 51, in particular of d by considering a certain limit movement $L_X$ which defines the subset D, is contained in blocks 52 to 57. Block 58 detects the collision if over this limit movement $L_X$ the value of $\Delta d_{max}$ is equal to or greater than the threshold value $L_{d,rel}$.

This management of the log 51 comprises the following steps:

52: Firstly the point of insertion of the new information regarding position and error signal $x_R(k)$, $d(k)$ in the circular array is determined.

53: If the circular array is full, then the oldest point is deleted so as to make room for a new data item; the length traversed in the segment thus removed is deleted from the length of the total path traversed during the log.

54: The information regarding position $x_R$ and error signal d is inserted.

55: The corresponding length traversed is added to the length of the total path traversed during the log.

56: The nub of the invention consists in reducing the size of the array considered to a subset of length traversed limited to $L_X$. This operation determining the relevant subset D requires the traversal of the circular array. The corresponding calculational burden limits the maximum size n of the circular array as a function of the calculation unit available. For the oldest segment of the log, the coordinates of the point corresponding precisely to the length $L_X$ must be interpolated separately. This additional functionality in step 56 serves to improve the precision of the algorithm, especially at high speed of movement of the load where the ultimate number of samples is small, for example close to 3.

57: The dynamic range of the kinetic defect d is evaluated by determining $\Delta d_{max}$.

58: Finally the dynamic range $\Delta d_{max}$ is compared with the limit $L_{d,rel}$.

Figure 6A:
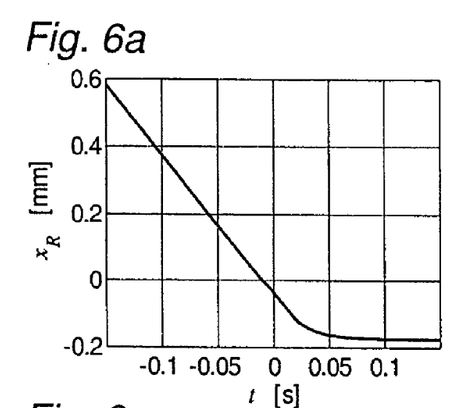
FIG. 6a is a chart of the positions $x_R$ [mm] occupied by the load as a function of time t[s].
Figure 6B:
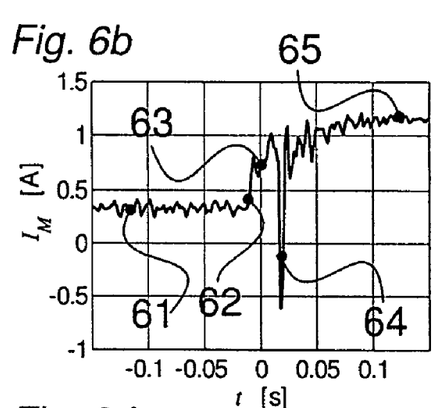
FIG. 6b illustrates the current $I_M$ [A] of the motor as a function of time t[s].

The application of the present invention to the detection of a collision on a stop 19 equipped with elastic washers as illustrated in FIG. 1 and the combination with a spindle stoppage resulting therefrom is shown in FIG. 6. FIGS. 6a, b, c show the evolution, as a function of time, of the position $x_R$, of the motor current $I_M$ and of the error signal or kinetic defect d of the spindle. FIG. 6d represents this error signal d as a function of position $x_R$. The succession of events is detailed hereinbelow:

During the approach phase 62, the signal d remains small and the motor current $I_M$ serves only to compensate for the friction in the spindle; see FIG. 6b plot 61.

At the instant, denoted 62, the table of the machine where the load encounters the stop, which is situated at $x_R=0$. Thereafter, the signal d increases in amplitude. It should be noted in FIG. 6b that the variation in motor current $I_M$, observed in the period 62 to 63 where the spindle encounters the stop, is equal to around 0.5 A only. This is less than a level which would allow the application of collision detection procedures based on the current signal.

Figure 6C:
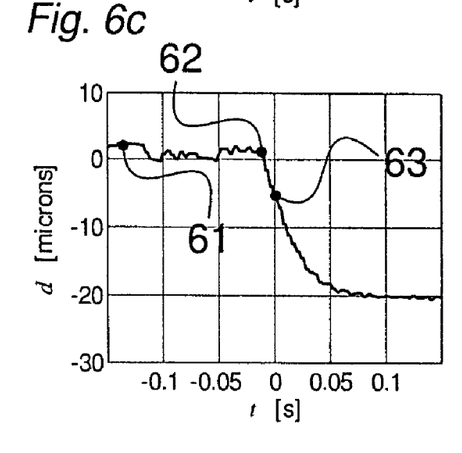
FIG. 6c shows the variations in the error signal d[microns] as a function of time t[s].

The programmed threshold of deformation $L_{d,rel}=5$ microns is overstepped at 63 at the instant t=0. The collision thus detected is then signaled to the servo-control of the spindle.

The collision is taken into account 16 msec after its detection, at the instant denoted 64. A controlled stoppage of the spindle is then instructed, this being manifested by the deceleration current spike, clearly visible in FIG. 6b. The delay between the detection of collision and the stoppage instruction gives rise to additional deformation of the transmission (5 microns) and thus leads to supplementary forces.

Figure 6D:
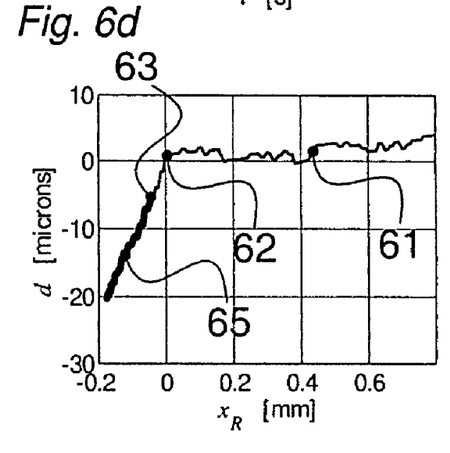
FIG. 6d illustrates the variations in the error signal d[microns] as a function of the positions [$x_R$] occupied by the load.

The collision signal remains active throughout the domain 65. As in the experiment illustrated here, no motion of relaxation of the constraints engendered by the collision has been envisaged, the current continues to increase up to 1.2 A. It is of course possible for the numerical control of the installation to be programmed to emit a spindle command ensuring the stoppage of the load with or without stress relaxation motion.

The mode of execution described hereinabove in regard to the principle of a rectangular sliding spatial window, while being precise is nevertheless relatively complex. It is necessary to manage a circular memory in which a number n of samples, 50 for example, is stored, from which number is extracted a variable number of relevant samples, from 3 to 50, depending on whether the speed is large or small.

The samplings are generally regulated by a clock, and therefore do not coincide with the relevant spatial bounds for the observation of the phenomenon. This makes it necessary, in particular when the number of samples retained is small, to make corrections by interpolation on the oldest sample, in order to guarantee precision.

To ascertain the dynamic range of the error signal, all the samples must be reviewed each time the software function is called, hence the need for suitable dimensioning so as not to overstep the limit duration of the processor's calculation loop.

Figure 8:
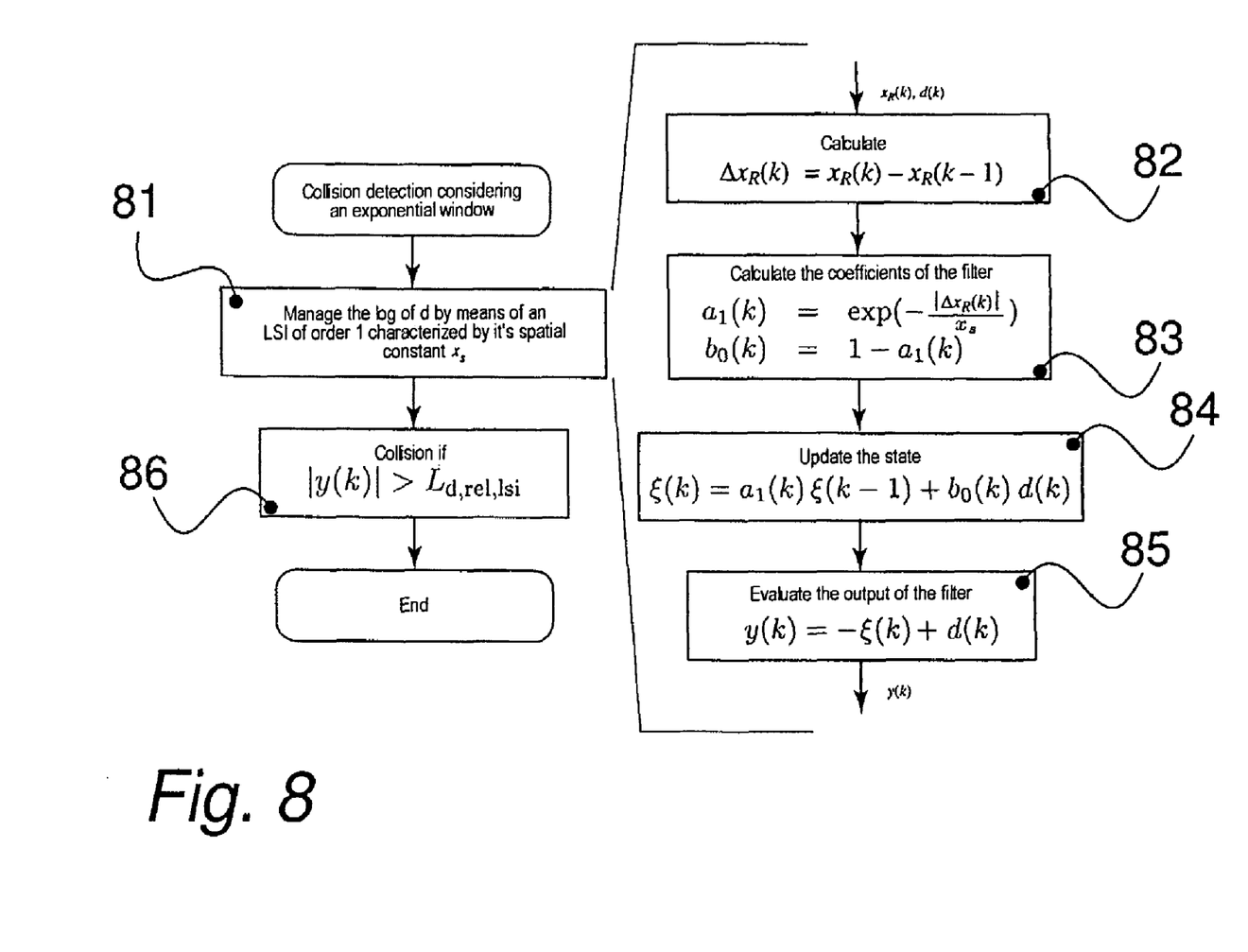
FIG. 8 illustrates a diagram of the flows used in the second mode of execution.

Making the assumption of a moderate acceleration, for example of the order of 0.5 m/sec² associated in the present case with a fast sampling period of 2 m/sec, a numerical integration by a spatially invariant, first order linear filter (LSI) makes it possible to provide a simpler and more economical mode of execution as summarized in FIG. 8. The behavior of this filter embodied digitally and regulated periodically over time is characterized by the spatial constant $x_S$.

The essence of the operations is contained in the block 81 and consists in carrying out a mapping into the spatial domain of the temporal information of the error signal d(k) regulated by the sampling clock. The block 81 contains the blocks 82, 83, 84, 85 for the management of the log of d by means of an LSI characterized by spatial constant $x_S$. It should be noted that $x_S$ is analogous to the movement $L_X$ defining D of the first mode of execution which carries out the restriction of the relevant domain of the data over a limited movement.

The block 86 detects the collision by performing the comparison with the threshold value $L_{d,rel,Isi}$.

The blocks 82 to 85 are similar to the blocks 52 to 57 of FIG. 5 and will make it possible to understand the simplification afforded by the second mode of execution.

The same variables $x_R(k)$, d(k) as are present in FIG. 5 at the input of the block 52 are found again at the input of the LSI filter and of the block 82.

The expression $\xi(k)=a_1(k) \xi(k-1)+b_0(k) d(k)$ of the block 84 must be viewed as a low-pass filter on the signal d(k).

$\xi(k-1)$ represents the state of $\xi(k)$ during the previous calculation loop, that is to say for example 2 msec before the present instant.

Stated otherwise, $\xi(k-1)$ is the memory of the log of the error signal, comparable to the circular memory 44 of FIG. 4 of the first mode of execution. It will be noted here that the second mode of execution uses only a single memory location to store the log whereas the first envisaged up to 50 thereof by way of example.

The calculation of $\xi(k)$ depends, according to the expression of block 84, on the spatial filtering parameters $a_1(k)$ and $b_0(k)$ calculated previously at 83 and updated at each calculation cycle, for example, each 2 msec.

$b_0(k)$ follows simply from $a_1(k)$, i.e. $b_0(k)=1-a_1(k)$

Figure 7A:
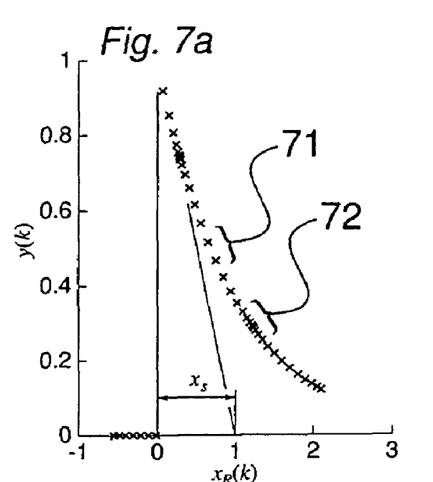
FIGS. 7a and 7b are charts of the output signal of the filter y(k) as a function of the positions $x_R(k)$ for a fast and slow movement.
Figure 7B:
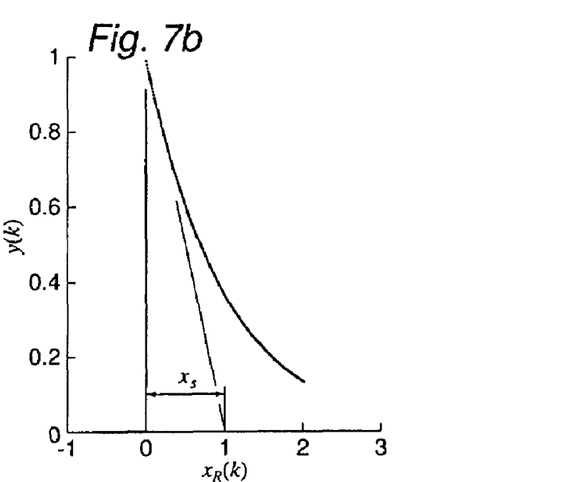

The exponential law written down at 83 demonstrates that the filtering constants depend on the path traversed during the last period $\Delta x_R(k)=x_R(k)-x_R(k-1)$ calculated in the block 82.

$$a_1(k) = \exp\left(-\frac{|\Delta x_R(k)|}{x_S}\right)$$

where $x_S$ [microns] is the space constant of the exponential window, see FIGS. 7a, 7b and its explanation hereinbelow. The constant $x_S$ is comparable to the width of the rectangular spatial window $L_x$ of the first mode of execution corresponding to the restriction of the relevant domain of the data over a limited movement.

The calculation of $a_1(k)$ according to this procedure ensures that the input/output properties of the filter, in the case of temporal sampling, are independent of the speed of the spindle, thus carrying out a mapping into the spatial domain of the temporal information regulated by the sampling clock.

$a_1(k)$ and $b_0(k)$ are fixed if the speed of the spindle is constant or if a spatial sampling is carried out directly.

As stated above, the expression $\xi(k)$ symbolized in the block 84 of FIG. 8 is a low-pass filter on the error signal d(k).

Stated otherwise, $\xi(k)$ retains only the components of the error signal that are characterized by low spatial frequencies and correspond in the case represented in FIG. 3 to the homokinetic defects, more precisely to the pseudo-period of around 7 mm and to the drifts of thermal type.

Finally, the expression $y(k)=-\xi(k)+d(k)$ of block 85 of FIG. 8 should be viewed as the high-pass filter complementary to the low-pass filter $\xi(k)=a_1(k) \xi(k-1)+b_0(k) d(k)$ of block 84, carrying out the operation similar to $$"\max_{k \in D} d_k - \min_{k \in D} d_k"$$

of the first mode of execution and which removes from the signal d(k) the spatial components that one wishes to tolerate.

This spatial filtering carried out by blocks 84 and 85 therefore makes it possible to dispense with the influence of the homokinetic transmission errors and enables, in the operation $|y(k)|>L_{d,rel,Isi}$ of block 86, the collision detection limit $L_{d,rel,Isi}$ to be placed at a lower value resulting in better sensitivity to the risk of collision that one wishes to detect.

As already stated above $\xi(k-1)$ is the memory of the log of the error signal, comparable to the circular memory 44 of FIG. 4 of the first mode of execution; however in this second mode of execution a single memory location is required to store the log. Such a simplification is made possible by virtue of the exponential window principle explained hereinbelow and by the fact that each sample taken into account in the integration participates therein with a weight that is all the lower according to an exponential decay, the further it is from the most recent sample; unlike for the rectangular window of the first mode of execution where the memory of the sample is completely erased beyond a distance away $L_X$.

FIGS. 7a to 7h show the characteristics of a spatially invariant filter (LSI) of order 1 realizing an exponential window. For the case illustrated, the input to the filter d(k) is chosen in such a way that d(k)=0 for all $x_R(k)<0$, and d(k)=1 for all $x_R(k) \geq 0$. This exemplary filter, being determined by the value of its spatial constant $x_S=1$, is then characterized by a relation between the position signal $x_R(k)$ and the output signal y(k) identical for all monotonic traversals $x_R(k)$. FIGS. 7a, c, e and g show a fast movement, at an average speed of $v_0=0.05$ mm/sec. FIGS. 7b, d, f and h show the behavior over the same path traversed, but at a slower average speed of $v_0=0.005$ mm/sec. In both cases a small sinusoidal component of speed has been added.

Figure 7C:
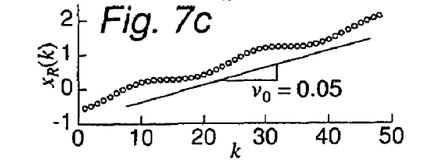
FIGS. 7c and 7d show the positions $x_R(k)$ as a function of the various measurement points k.
Figure 7D:
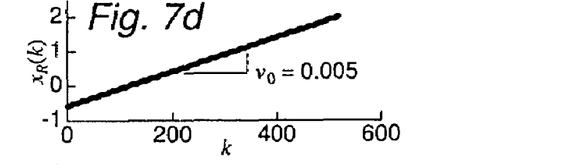
Figure 7E:
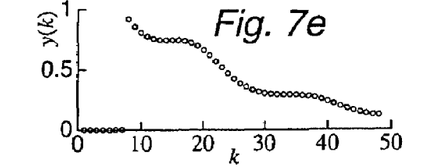
FIGS. 7e and 7f illustrate the output signal of the filter y(k) as a function of the various measurement points k.
Figure 7F:
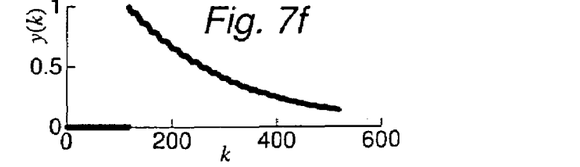
Figure 7G:
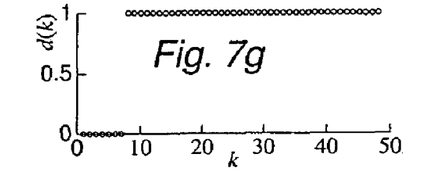
FIGS. 7g and 7h correspond to charts of the value of the error signal d(k) of the various measurement points k.
Figure 7H:
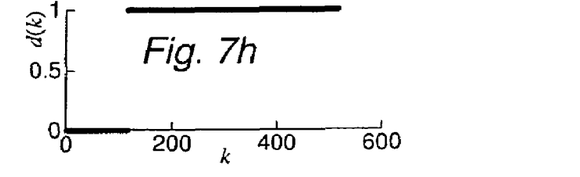

In FIG. 7a, the succession of the samples is shown with the aid of crosses. The zone designated 71 corresponds to a faster movement, conversely in zone 72. The instantaneous speed of movement is manifested by the slope of the positions $x_R(k)$ as a function of the samples k, which is shown in FIG. 7c. The position $x_R(k)=2$ is overstepped after the 48$^{th}$ sample. The evolution of the input signal, respectively of the output signal of the filter, is plotted in FIGS. 7g and e, respectively.

FIGS. 7b, d, f and h are characterized by a larger density of samples on account of the lower average speed.

Of course, the embodiments described hereinabove exhibit no limiting character and may be modified in any desirable way within the framework as defined by claim 1. In particular, the applications make it possible by the second mode of execution are not limited to the use of simple spatially invariant filters (LSI) of order 1. The above explanations make it possible to implement high-pass and low-pass filters in the spatial domain so as to dispense with a large part of the homokinetic defects. By choosing other values of spatial constant $x_S$, the theory of digital filters makes it possible to extend the procedure and to combine well-known bandstop or bandpass filters so that the tolerable homokinetic components of the error signal can be extracted still more finely. The device and the method described may also be applied to apparatuses and machines having several spindles and to circular or any non-linear movements.

The invention claimed is:

1. A numerically controlled drive device comprising a device for detecting operating anomalies intended for detecting accidental collisions, comprising:

at least one motor (14) able to drive a load (18) along at least one path by way of an assembly of transmission elements (T), first means for measuring position (15) disposed upstream of at least one of the elements of the said assembly for transmission to the motor (14) and intended to provide a first value of position ($X_M$), second means for measuring position (16) disposed downstream of this element of the assembly for transmission to said load (18) and intended to provide a second value of position ($X_R$) corresponding to the position of the load on said path, means for calculation (20) for establishing at predetermined intervals (h) error signals (d) corresponding to a difference of the first and second values of position, and means for analysis for analyzing these error signals so as to detect accidental collisions, wherein the means for analysis comprise discrimination means devised in such a way as to analyze said error signals (d) obtained in said predetermined intervals as a function of the path ($X_R$) traversed in a spatial reference frame (d, $X_R$) with a view to discriminating between errors due to an accidental collision and those due to at least one other cause.

2. The device as claimed in claim 1, wherein said transmission assembly (T) possesses a flexibility of transmission which is used by virtue of said error signals (d) as force gauge relating to a driving of the load (18).

3. The device as claimed in claim 1, wherein the means for discrimination comprise at least one restriction of a relevant domain of the data pertaining to the error signals over a limited movement of the load along the path forming at least one spatial window ($L_X$, $X_S$) featuring a path traversed by the load devised in such a way as to discriminate between errors due to an accidental collision and those due to at least one other cause.

4. The device as claimed in one of claims 1, wherein the means for discrimination consist of spatial means for filtering adapted for discarding homokinetic errors and/or errors due to thermal variations.

5. The device as claimed in claim 4, wherein the means for filtering comprise two circular arrays of data (44, 45) pertaining on one hand to movements ($X_R$) of the load over said path and on an other hand to the error signals (d) corresponding to the movements and at least one spatial rectangular window (D) comprising a most recent data pertaining to the movements ($X_R$) and to said error signals (d) extracted from the two circular arrays.

6. The device as claimed in claim 5, wherein the means for filtering are devised so as to:

record in accordance with a predetermined sampling period (h) samples of pairs of variables pertaining to the movements ($X_R$) of the load and to the error signals (d) associated with these movements in the two circular arrays which are of size n so as to form pairs of logging data $X_{R(k)}$, $d_{(k)}$, an index 1 of the coefficient k denoting a last sample recorded;

extract a subset of the most recent successive samples $$D = \{i : 1 \leq i \leq i_{max}\}$$

for which the domain of positions traversed by the load (18) over said path is less than or equal to a first fixed and predetermined limit ($L_x$) corresponding to spatial width of said rectangular window such that $$\sum_k |x_R(k) - x_R(k-1)| \leq L_x \quad \forall k \in D$$

this subset of successive samples (D) forming a spatial rectangular window in which are found as abscissa the movements ($x_R$) of the load and as ordinate the error signals (d), a value of the first limit ($L_x$) being predetermined so as to be a fraction of a period of the error or errors to be discarded;

detect a collision which is defined by overstepping of a second predetermined limit ($L_{d, rel}$) of the dynamic range of the error signal (d) over the subset (D) chosen in the rectangular window according to the operation $$\Delta d_{max} = \max_{k \in D} d_{(k)} - \min_{k \in D} d_{(k)} \geq L_{d,rel}$$

where max d(k), respectively mm d(k) are the maximum, respectively minimum values of d in the subset D.

7. The device as claimed in claim 6, wherein said second limit $L_{d,rel}$ is fixed at m % of the maximum value of $\Delta d_{max}$ determined for situations of movements of the load without collision, m advantageously lying between 120 and 250, very favourably between 140 and 200, and preferably being equal to 150.

8. The device as claimed in claim 6, wherein the means for filtering comprise interpolation means devised so as to obtain by interpolation for said first limit ($L_x$) of the spatial rectangular window a value of interpolation of the error signal (d), this first limit ($L_x$) and said value of interpolation being stored as oldest samples of the spatial rectangular window.

9. The device as claimed in claim 4, wherein the means for filtering comprise at least one spatially invariant linear filter which comprises an exponential spatial window.

10. The device as claimed in claim 9, wherein space constant (s) ($X_s$) of the spatially invariant linear filter or filters is or are fixed according to homokinetic defects that one decides to tolerate.

11. The device as claimed in claim 10, wherein the means for filtering are devised so as to record in accordance with a predetermined sampling period a sample of a pair of variables $x_R(k)$, $d(k)$ pertaining respectively to movement of the load and to associated error signal, calculate at each sampling period a signal $\xi(k)$ according to the equation $$\xi(k)=a_1(k)\xi(k-1)+b_0(k)d(k)$$

where $\xi(k-1)$ is the memory of the log of an error signal and where $$a_1(k) = \exp\left(-\frac{|\Delta x_R(k)|}{x_s}\right), \quad \Delta x_R(k) = x_R(k) - x_R(k-1)$$

calculate an output signal $y(k)$ according to the equation $$y(k)=-\xi(k)+d(k)$$

detect a collision which is defined by the overstepping of a predetermined limit $L_{d,rel,Isi}$ according to the operation $|y(k)|>L_{d,rel,Isi}$.

12. A method of detecting operating anomalies intended for detecting accidental collisions in numerically controlled drive devices comprising:
at least one motor (14) able to drive a load (18) along at least one path by way of an assembly of transmission elements (T),
first means for measuring position (15) disposed upstream of at least one of the elements of the said assembly for transmission to the motor (14) and intended to provide a first value of position ($X_M$),
second means for measuring position (16) disposed downstream of this element of the assembly for transmission to said load (18) and intended to provide a second value of position ($X_R$) corresponding to the position of the load on said path,
means for calculation (20) for establishing at predetermined intervals error signals (d) corresponding to a difference of the first and second values of position, and
means for analysis for analyzing these error signals so as to detect accidental collisions,
wherein means for discrimination are employed so as to analyze said error signals (d) obtained in said predetermined intervals as a function of the path ($X_R$) traversed in a spatial reference frame (d, $X_R$) with a view to discriminating between errors due to an accidental collision and those due to at least one other cause.

13. The method as claimed in claim 12, wherein as force gauge relating to a driving of the load (18) use is made of the flexibility of transmission of said transmission assembly (T) by virtue of said error signals (d).

14. The method as claimed in claim 12, wherein the error signals (d) are analyzed by the means for discrimination by performing at least one restriction of the relevant domain of the data pertaining to the error signals over a limited movement of the load along the path forming at least one spatial window ($L_x$, $X_S$) featuring a path traversed by the load devised in such a way as to discriminate between errors due to an accidental collision and those due to at least one other cause.

15. The method as claimed in one of claim 14, wherein use is made of means for discrimination comprising spatial means for filtering adapted for discarding homokinetic errors and/or errors due to thermal variations.

16. The method as claimed in claim 15, wherein a filtering is carried out performed by the means for filtering comprising two circular arrays of data (44, 45) pertaining on one hand to the movements ($X_R$) of the load over said path and on an other hand to the error signals (d) corresponding to these movements and at least one spatial rectangular window (D) comprising most recent data pertaining to said movements ($X_R$) and to said error signals (d) extracted from the two circular arrays.

17. The method as claimed in claim 16, which consists in:
recording in accordance with a predetermined sampling period (h) samples of pairs of variables pertaining to the movements ($X_R$) of the load and to the error signals (d) associated with these movements in the two circular arrays which are of size n so as to form pairs of logging data ($x_R(k)$, $d(k)$), an index 1 of the coefficient k denoting a last sample recorded;
extracting a subset of most recent successive samples $$D=\{i:1 \leq i \leq i_{max}\}$$

for which the domain of positions traversed by the load (18) over said path is less than or equal to a first fixed and predetermined limit ($L_x$) corresponding to the spatial width of said rectangular window such that $$\sum_k |x_R(k) - x_R(k-1)| \leq L_x \quad \forall k \in D$$

this subset of successive samples (D) forming a spatial rectangular window in which are found as abscissa the movements ($x_R$) of the load and as ordinate the error signals (d), a value of the first limit ($L_x$) being predetermined so as to be a fraction of a period of the error or errors to be discarded;

detecting a collision which is defined by overstepping of a second predetermined limit ($L_{d,rel}$) of the dynamic range of the error signal (d) over the subset (D) chosen in the rectangular window according to the operation $$\Delta d_{max} = \max_{k \in D} d(k) - \min_{k \in D} d(k) \geq L_{d,rel}$$

where $\max_{KED} d(k)$, respectively $\min_{KED} d(k)$ are the maximum, respectively minimum values of d in the subset D.

18. The method as claimed in claim 17, wherein said second limit $L_{d,\,rel}$ is fixed at m % of the maximum value of $\Delta d_{max}$ determined for situations of movements of the load without collision, m advantageously lying between 120 and 250, very favourably between 140 and 200, and preferably being equal to 150.

19. The method as claimed in claim 17, wherein means for interpolation are employed so as to calculate for said first limit ($L_x$) of the spatial rectangular window a value of interpolation of the error signal (d), this first limit ($L_x$) and said value of interpolation being stored as oldest samples and which are furthest away of the spatial rectangular window.

20. The method as claimed claim 15, wherein a filtering is carried out by the means for filtering comprising at least one spatially invariant linear filter which comprises an exponential spatial window.

21. The method as claimed in claim 20, wherein a space constant(s) ($x_s$) of the spatially invariant linear filter or filters is or are fixed according to homokinetic defects that one decides to tolerate.

22. The method as claimed in claim 21, wherein two or more high-pass, low-pass, bandstop or bandpass filters are combined, for each of which is chosen a different value of the spatial constant so as to extract precisely a tolerable homokinetic components of the error signal (d).

23. The method as claimed in claim 21, which consists in
- recording in accordance with a predetermined sampling period a sample of a pair of variables ($x_R(k)$, $d(k)$) pertaining respectively to a movement of the load and to associated error signal,
- calculating at each sampling period a signal $\xi(k)$ according to an equation $$\xi(k)=a_1(k)\xi(k-1)+b_0(k)d(k)$$

where $\xi(k-1)$ is the memory of the log of the error signal and where $$a_1(k) = \exp\left(-\frac{|\Delta x_R(k)|}{x_S}\right), \Delta x_R(k) = x_R(k) - x_R(k-1)$$

calculating an output signal y(k) according to the equation $$y(k)=-\xi(k)+d(k) \text{ and}$$

detecting a collision which is defined by the overstepping of a predetermined limit $L_{d,rel,Isi}$ according to the operation $|y(k)|>L_{d,rel,Isi}$.

* * * * *